March 8, 1966 W. F. MEYERS 3,239,385
FLUID DISCHARGE DEVICE
Filed May 21, 1963
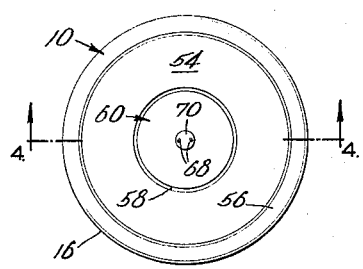
FIG. 2.
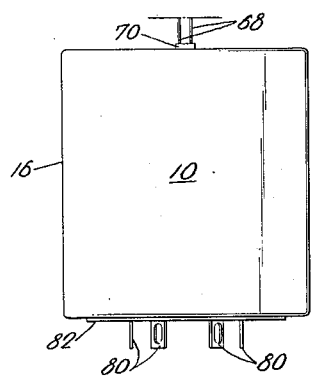
FIG. 1.
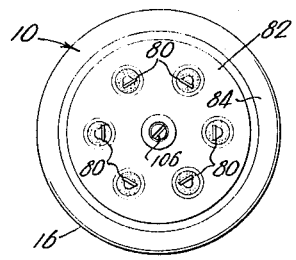
FIG. 3.
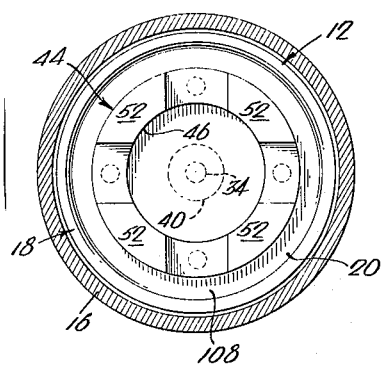
FIG. 6.
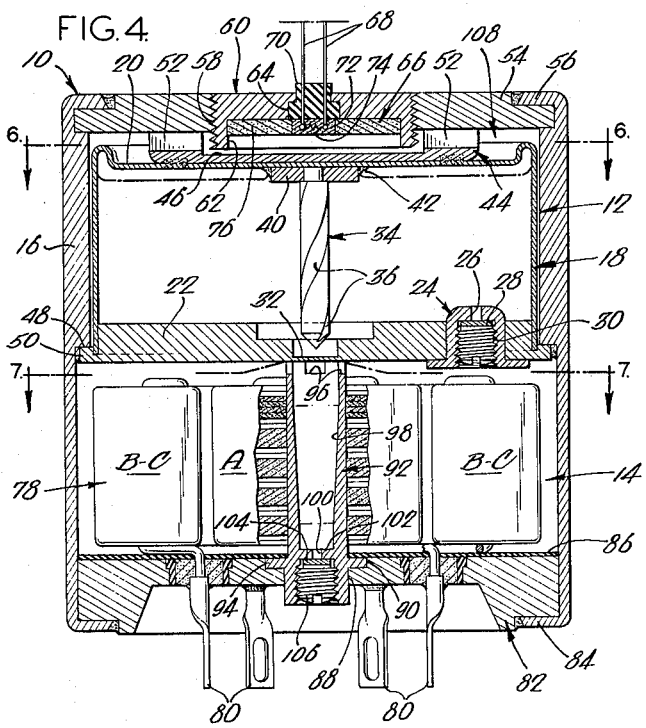
FIG. 4.
FIG. 5.
FIG. 7.
Inventor:
William F. Meyers
by Howson &
Howson Attys.

United States Patent Office 3,239,385
Patented Mar. 8, 1966

3,239,385
FLUID DISCHARGE DEVICE
William F. Meyers, Blue Bell, Pa., assignor to G. & W. H. Corson, Incorporated, Plymouth Meeting, Pa., a corporation of Delaware
Filed May 21, 1963, Ser. No. 281,964
7 Claims. (Cl. 136—90)

The present invention relates generally to a fluid-discharge device adapted for storing a dischargeable fluid until a predetermined time, or in response to an activating signal, whereupon the liquid will be discharged from the container. The fluid-discharge device of the present invention has broad application to varying situations and uses, as will be apparent from the following detailed description thereof.

The present invention is particularly suitable for activating electrochemical batteries of a deferred-action or reserve type wherein the electrolyte fluid or liquor is discharged into one or more dry-charged cells, and maintaining the fluid in the cells regardless of attitude or action of the battery.

While various systems have been heretofore utilized for maintaining a fluid or electrolyte in a storage container, and discharging the same therefrom at a given desired time, certain drawbacks in structure and operation have existed which resulted in these prior devices being not wholly satisfactory under certain operating conditions.

It is therefore an object of the present invention to provide an improved fluid-discharge device which, while having broad application of use, is particularly suitable as an improved activator for deferred-action batteries and more particularly for dispensing or discharging liquid ammonia or other electrolytes to activate a battery assemblage or device of known types.

It is also an object of the present invention to provide a fluid-discharge device usable as a liquid ammonia battery actuator capable of withstanding the high vapor pressure of liquid ammonia at ordinary temperatures, and overcoming other special packaging techniques required.

A further object of the present invention is to provide a device having the ability to activate such batteries rapidly under full load conditions, and making it possible to store the batteries for considerable periods of time over a wide temperature range with virtually no change in ultimate battery performance.

A still further object of the invention is to provide a fluid-discharge device which includes a reservoir for storing the fluid, and a device actuatable to simultaneously pierce a reservoir wall and positively displace or discharge the fluid therefrom, and thereafter maintain a residual pressure to prevent return or re-entry of the fluid into the reservoir. This latter is accomplished by use of a piercing or drill lance actuatable by controllable pneumatic, hydraulic, electrical, mechanical, inertial force or the like, and coupled with a drive disc serving to collapse the container constituting the reservoir for forceful discharge of the fluid therefrom.

For purposes of a full understanding of the structure and operation of the present invention, an embodiment thereof wherein the fluid discharge device serves as an activator section for a liquid ammonia battery will be described, but it is understood that use of the invention is not limited thereto.

The invention will be described in greater detail with reference to the accompanying drawing in which:

FIG. 1 is an elevational view of a liquid ammonia deferred-action type battery incorporating the present invention;

FIG. 2 is a plan view of the battery;

FIG. 3 is an inverted plan view of the battery;

FIG. 4 is an enlarged vertical section taken on line 4—4 of FIG. 2;

FIG. 5 is a fragmentary section similar to FIG. 4, during a different stage of operation;

FIG. 6 is a sectional view of a reduced scale taken on line 6—6 of FIG. 4; and

FIG. 7 is a sectional view similar to FIG. 6 taken on line 7—7 of FIG. 4.

The battery 10 shown in the drawings for illustrative purposes only of a particularly suitable use of the present invention includes an activator section 12 and a battery compartment 14 which contains a battery assemblage. An outer shell or container 16 of generally cylindrical configuration is manufactured from steel and designed to withstand and sustain very high internal pressures, and in a known form of liquid ammonia battery is designed to sustain a pressure of 3000 pounds per square inch which provides an ample factor of safety since the vapor pressure of liquid ammonia at plus 74° C. is approximately 520 p.s.i. The activator section of the battery contains a liquid ammonia reservoir cup, which will be referred to hereinafter as the activator cup 18, and consists of a cup-shaped member formed of steel having the desired tensile strength and having on its top surface a centrally formed inwardly deformed portion 20. The open end of the cup 18 is closed by a steel bulkhead 22 which is brazed to the cup to form a sealed container. A bore is provided through the steel bulkhead in which is inserted a boss 24 which is sealed in the bore. This boss has a passage therethrough, as generally indicated at 26, and which is susceptible of being closed by means of a disc gasket 28 and a screw threaded set screw 30. The purpose of this portion of the activator cup is to permit filling it with liquid ammonia or other electrolyte solution. The center of the steel bulkhead 22, in the interior of the activator cup, has a thinned area 32 and this constitutes a rupturable membrane for purposes hereinafter to be set forth.

A drill lance 34 having a pointed lower end and preferably spiral or other configurated grooves as at 36 is connected to the inner surface of the center of the deformed portion of cup 20 by means of a lance support disc 40, which is brazed or welded as at 42 to the surface of the material. A metal drive disc 44 is brazed or welded centrally to the upper surface of the deformed portion of the cup 20 and has a centrally depressed region 46 for a purpose as will hereinafter appear. An internal shoulder 48 is provided in outer shell 16 and a flange 50 is formed at the periphery of brazed bulkhead 22 and coact to position the activator cup within the shell as shown in the drawing. The upper surface of drive disc 44 outwardly from the centrally depressed region 46 is castellated to form upstanding lugs 52 to provide passageways therebetween and the inner surface of top cap 54 which closes one end of the outer shell 16. The shell and top cap are joined by rolling over a thinned portion 56 of the shell material and brazing the portions together to form a seal.

Centrally of the top cap 54 in this embodiment of the invention there is a threaded bore 58 in which is insertable an externally threaded gas generator cup 60 and preferably a plastic sealing material is disposed on the coacting threads upon insertion to provide a gas tight seal. A recess 62 is formed on the inner side of cup 60 and a flanged bore 64 extends therebetween and the outer surface of the cup.

As pointed out hereinbefore activating mechanism can assume many different forms or types. As shown in this embodiment there is utilized a moderate rate chemical propellant or gas generator generally designated 66. This is of a known type and generally consists of lead in wires 68 passing through a plastic plug 70 or the like in sealed relationship in the bore 64. A disc of easily ignitable material 72 has the ends of wires 68 terminating thereat and these ends are interconnected by a heating or igniting element 74. This mechanism is in the nature of an electric match and activatable by means of a suitable source of electrical energy (not shown) attachable to the leads 68. Upon energization the material of the disc 72 readily and rapidly ignites. A disc 76 of a moderate rate chemical propellant or gas generator material is in contact with the material of disc 72 and upon activation will become ignited and thereafter burn at a predetermined rate to create or generate a gas. The result of this gas generation will hereinafter be described in greater detail.

The foregoing description pertains to the activator section 12. The battery compartment 14 and components contained therein will now be described. A battery assemblage generally designated 78 is mounted within the shell in the battery compartment and consists in groups of A, B, C sections each containing a plurality of cells appropriately electrically connected and which form a known type of ammonia electric current-producing cell system actuatable by a liquid ammonia electrolyte. Since this battery assemblage is generally substantially known in the art, it is not necessary to describe the specific construction and operation herein. Generally speaking however, the battery assemblage comprises three sections including an A section and a composite B, C section properly supported within the battery compartment, properly wired and a plurality of terminals 80 are connected to the leads and extend through a terminal plate 82 which, after insertion in the shell, is secured thereto by means of overturned ends 84 of the shell 16 which is thereafter soldered in a known manner. An insulator layer 86 can, if desired, surmount the top of the terminal plate 82.

Centrally of the terminal plate 82 there is a bore 88 having a step 90 therein. A cylindrical guide tube 92 having a flange 94 thereon has its lower end extending through the bore 88 with the flange 94 seated on the step 90 in a manner to form a sealed construction. The guide tube extends upwardly into contact with the underside of bulkhead 22, having its upper end castellated to form openings as at 96 to provide liquid flow passages as will appear hereinafter. The inner bore 98 is tapered and at the lower smaller end has an opening 100 extending through web 102. This opening 100 is sealable by means of a disc gasket 104 and a threaded set screw 106. This arrangement provides for access into the interior of the battery compartment as will be obvious and can be used to partially or completely evacuate air from the sealed battery compartment, etc.

The structure of the invention having been set forth in detail hereinabove, activation and operation of the invention will be described hereinbelow. At a predetermined selected time when it is desired to activate the battery, the energizing means for the igniting element is activated which will cause a substantially immediate combustion of the inflammable disc 72, which in turn will ignite the gas generator material 76, which will proceed to generate gas at a predetermined rate and will initially flow into depression 62, centrally depressed region 46, through the passages formed by lugs 52 and therefore will fill the entire compartment 108 above the top surface of the activator cup 18. Upon further generation of gas, and this occurs not instantaneously or explosively but at a moderate rate even though accomplishing its purpose very rapidly, the force of the expanding gas will downwardly deform the upper end of the activator cup and simultaneously drive lance 34 downwardly through the thinned area 32 forming the membrane, piercing the same as shown at 110 in FIG. 5, which shows initiating actuation of the device, and force or positively displace the electrolyte from the activator cup downwardly through the ruptured membrane and into the battery compartment. By virtue of the grooves 36 or the like and the openings formed because of the castellated upper end of guide tube 92, this flow into the battery compartment as indicated by arrows at 112 can occur. The generated gas will continue to deform the activator cup and displace the liquid electrolyte into the battery compartment to thereby activate the battery until such time as the pressure in the battery compartment equalizes the pressure above the actuator cup. The amount of gas to be generated can, of course, be controlled so as to insure positive displacement of sufficient liquid electrolyte or ammonia to properly activate and operate the battery. Additionally, due to the residual pressure of the gas there is no likelihood or possibility of the material of the activator cup being even partially returned or restored to its initial position or condition and this continued deformation prevents any of the liquid electrolyte from flowing out of the battery compartment and returning to the activator cup. This results in continued operation and efficiency of the battery regardless of the attitude of the battery or carrying vehicle.

As pointed out hereinbefore the materials for the activator cup and components thereof are so selected as to provide a storage reservoir for the liquid electrolyte under extremes of conditions such as temperature and yet the mechanism can be operated effectively under the most adverse condition of temperature and pressure. For different materials the strength of and composition of the storage reservoir can be varied.

While the foregoing description has related to a gas generator type of activation force, it has been pointed out that other means could be utilized such as fluid, mechanical etc. In this event, the gas generator mechanism and associated parts can be replaced for example by a single tube leading into the area above the drive disc for admission of fluid or air under pressure or a simple mechanical screw or the like could be utilized.

As also set forth hereinabove the detailed description of an embodiment of the invention as applied to a battery is not to be considered restrictive since obviously the activator mechanism is susceptible of containing many different types of fluids and materials for various uses and the mechanism could serve the same purpose as before described.

Manifestly minor changes can be effected in details of construction without departing from the spirit and scope of the invention as defined in and limited solely by the appended claims.

I claim:

1. In a deferred action electrochemical battery an enclosed, sealed casing having an activator section and a battery compartment, an activator cup for containing a liquid electrolyte mounted in said activator section, said activator cup mounting interiorly thereof a pointed piercing lance directed toward the open end of said cup, a casing dividing bulkhead closing and sealing the end of said cup and having a pierceable membrane area formed thereof, said activator cup being of self-sustaining but deformable material, said membrane being positioned adjacent the battery compartment, and externally actuatable means for creating a force between the interior of said casing and the bottom exterior of said cup and operable upon actuation to deform the material of said cup toward said bulkhead to simultaneously move said lance to pierce said membrane and forcefully discharge the electrolyte from said activator cup into the battery compartment.

2. In a battery as claimed in claim 1, said piercing lance having a grooved surface thereon whereby upon piercing of the container flow of liquid therefrom is initiated.

3. In a battery as claimed in claim 2, said force creating means being operable to maintain a residual deforming force on said cup to prevent return of discharged fluid into said cup.

4. In a battery as claimed in claim 3, a drive disc secured externally of the bottom of said cup and against which said force is applied.

5. In a battery as claimed in claim 4, said drive disc being castellated on the free surface thereof to form upstanding lugs engageable with the interior surface of said casing and adapted to form fluid flow passages between said disc and said casing.

6. In a battery as claimed in claim 5, a guide tube extending from the exterior of said bulkhead into said battery compartment, the open end of said guide tube surrounding the area of said membrane and the opposite end thereof being secured to the end surface of said battery compartment, said open end being castellated and providing fluid flow passages upon piercing of said membrane.

7. A fluid discharge device comprising a casing, a container constituting a sealed fluid reservoir mounted within said casing, said container having a first inner surface portion and a second surface portion having a thinned wall thickness and constituting a rupturable diaphragm, the material of said container being self-supporting but deformable under pressure, a piercing lance having a grooved surface thereon secured to the first portion of the inner surface of said container and having a pointed end thereof directed toward the second surface portion of said container, a drive disc secured externally of said first portion of said container, said drive disc castellated on the free surface thereof to form upstanding lugs engageable with the interior surface of said casing and adapted to form fluid flow passages between said disc and said casing, externally actuable means for creating a force between said casing and the outer surface of the container having the piercing lance carried thereby and operable upon actuation to deform the container wall to simultaneously move said lance to pierce said second surface portion of the container and forcefully discharge fluid therefrom, said force creating means being operable to maintain a residual deforming force on said container to prevent return of discharged fluid into said container.

References Cited by the Examiner
UNITED STATES PATENTS

| | | | |
|---|---|---|---|
| 2,780,389 | 2/1957 | Sandgren | 222—5 |
| 2,832,814 | 4/1958 | Shannon | 136—90 |
| 2,937,220 | 5/1960 | Bauman | 136—90 |
| 2,959,326 | 11/1960 | Pouliot | 222—5 |
| 2,989,381 | 6/1961 | Musser | 222—81 X |
| 3,075,035 | 1/1963 | Kardorff et al. | 136—90 |

LOUIS J. DEMBO, *Primary Examiner.*

JOHN R. SPECK, EVERETT W. KIRBY, *Examiners.*